Jan. 13, 1959  HANS-JOACHIM JABCZYNSKI ET AL  2,868,883
ELECTRONIC STOP CONTROL FOR SWITCHES HAVING A
MOTOR COMPRISING TWO DRIVE MAGNETS

Filed April 10, 1952  3 Sheets-Sheet 1

Inventors.
Hans Joachim Jabczynski,
Gerd Tiesler,
Hans Joachim Lark, &
Konstantin Schröder.

By  Atty.

Jan. 13, 1959   HANS-JOACHIM JABCZYNSKI ET AL   2,868,883
ELECTRONIC STOP CONTROL FOR SWITCHES HAVING A
MOTOR COMPRISING TWO DRIVE MAGNETS
Filed April 10, 1952   3 Sheets-Sheet 2
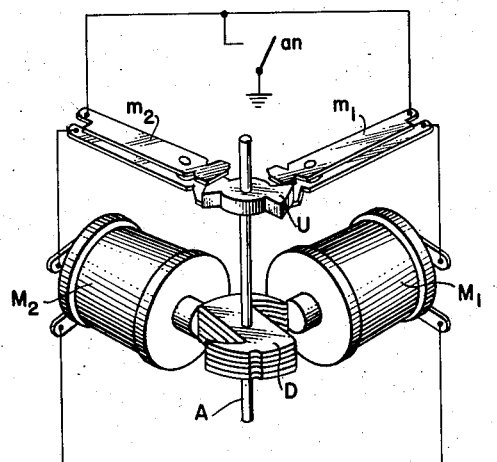
Fig. la
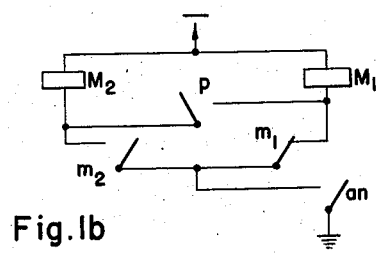
Fig. lb
INVENTORS
Hans Joachim Jabczynski,
Gerd Tiesler,
Hans Joachim Lurk, &
Konstantin Schröder.
BY
ATTORNEY

2,868,883
Patented Jan. 13, 1959

United States Patent Office

2,868,883

ELECTRONIC STOP CONTROL FOR SWITCHES HAVING A MOTOR COMPRISING TWO DRIVE MAGNETS

Hans-Joachim Jabczynski, Berlin-Zehlendorf, Gerd Tiesler, Berlin-Charlottenburg, Hans-Joachim Lurk, Berlin-Siemensstadt, and Konstantin Schröder, Berlin-Staaken, Germany, assignors to Siemens & Halske Aktiengesellschaft, Munich and Berlin, Germany, a corporation of Germany Application April 10, 1952, Serial No. 281,626

Claims priority, application Germany May 5, 1951

10 Claims. (Cl. 179—18)

This invention relates to switches used in signalling systems, for example, automatic telephone systems, especially to switches of the type having a motor for driving a wiper-carrying shaft, such motor having two drive magnets which are alternately switched in by associated control contacts governed by cam means carried by the switch shaft so as to drive the shaft and therewith the wipers relative to associated bank contacts, and is particularly concerned with electronic control means for stopping the motor by simultaneous actuation of the two drive magnets at the instant when the switch wipers engage desired bank contacts.

The various objects and features of the invention will now be described with reference to the accompanying drawings, wherein Fig. 1 shows a stop control circuit employing two discharge tubes;

Figure 1:
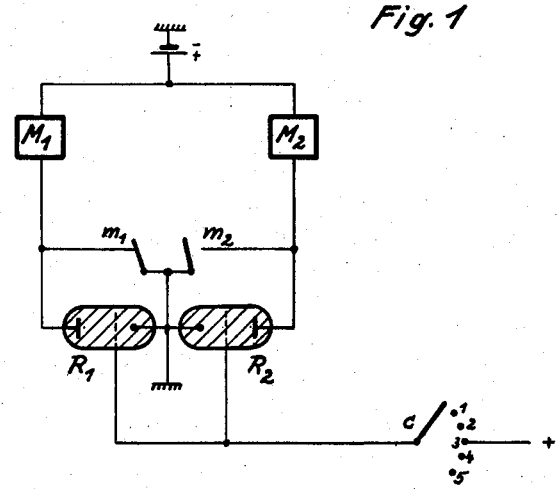
Fig. 1a shows the drive means for a switch embodying the stop control according to the invention.
Fig. 1b shows a known stop control circuit.

As has been said before, the invention relates to switches of the type having two alternately operating drive magnets. Such drive motor or means is disclosed in U. S. Patent No. 1,978,700. Fig. 1a shows schematically the salient parts of such drive means. It comprises two magnets $M_1$ and $M_2$, an armature D disposed upon a shaft A which also carries a cam U for controlling contacts $m_1$ and $m_2$. Reference $an$ indicates a start contact which upon actuation starts operation of the drive. Current is thereby supplied to the drive magnet ($M_1$ or $M_2$) by way of the contact ($m_1$ or $m_2$) which is respectively associated therewith and which happens to be in closed position when contact $an$ is actuated. Assuming that contact $m_1$ is in closed position, magnet $M_1$ will receive current and will actuate armature D, rotating it and thereby rotating the cam U, thus causing opening of contact $m_1$, thereby deenergizing magnet $M_1$ and closing contact $m_2$ for energizing magnet $M_2$ which continues rotation of the armature D and therewith rotation of the cam member U. Magnets $M_1$ and $M_2$ are in this manner alternately switched in to rotate the shaft A. The shaft carries wipers (not shown in Fig. 1) for cooperation with bank contacts.

The relatively sudden stopping of a motor switch employing such drive means or motor, with the wipers in engagement with desired bank contacts, is in known circuits effected by a contact of a testing relay which effects simultaneous energization of both drive magnets $M_1$ and $M_2$. Such known circuit is indicated in Fig. 1b. Upon closure of contact $p$ (controlled by a testing relay; not shown) the contact $m_2$ (assumed to be open at the instant when the test or private wiper of the switch encounters an idle trunk or line) is bridged and both drive magnets $M_1$ and $M_2$ will be energized, thereby stopping further rotation of the shaft with the wipers in engagement with the bank contacts connected with the idle trunk.

Motor switches of the type referred to, provided with the above explained drive motor means operate very fast and, accordingly, require quick operating testing relays. Special testing relays have been developed for this purpose but their speed of operative actuation is in many cases insufficient. Such relays are moreover very sensitive to shocks.

The invention overcomes these drawbacks by the provision of discharge tubes for effecting the stopping of motor switches of the type described. The discharge tubes employed are made conductive by a potential which marks the stopping position of the corresponding switch and cause simultaneous energization of the motor magnets.

The drive magnets are, as in Figs. 1a and 1b in each embodiment indicated by $M_1$ and $M_2$. These magnets are in each case adapted to drive an armature such as D in Fig. 1a for rotating the associated switch shaft which may be suitably fastened thereto or geared therewith. The switch shaft may be provided with cams such as U in Fig. 1a for governing the actuation of control contacts $m_1$ and $m_2$ associated with the circuits for the respective drive magnets. As described with reference to Figs. 1a and 1b, the control by these contacts is, for example, such that the drive magnet $M_1$ is energized over a circuit including its control contact $m_1$ to rotate the armature, and therewith the switch shaft with its wipers, until the shaft reaches a certain angular position in which the control contact $m_1$ is opened by its control cam, while the control contact $m_2$ is closed. Accordingly, the drive magnet $M_1$ will be disconnected, and the magnet $M_2$ will be be energized to continue rotation of the armature and shaft until the latter reaches an angular position in which the drive control is again transferred to the magnet $M_1$ by the closure of control contact $m_1$, while the magnet $M_2$ is disconnected by opening the control contacts $m_2$.

The switch may be so constructed that an angular displacement of the armature controlled by the drive magnets, by 90°, corresponds to one switching step of the wipers, including the test or private wiper $c$ shown in the drawings. Accordingly, the wiper $c$, will be in engagement with a bank contact at the conclusion of each step. One or the other of the drive magnets $M_1$ or $M_2$ will at this instant be inactive and its respectively associated control contact $m_1$ or $m_2$ will be open. If the bank contacts which had been seized by the switch wipers are the desired contacts (for example, the contacts of an idle trunk line in the case of a hunting selector switch) on which they should be stopped, a certain potential, for example, ground in the case of the embodiment, Fig. 1, will be picked up by the test wiper $c$, and one or the other of the two discharge devices $R_1$ or $R_2$, namely, the one which is associated with the now inactive drive magnet and control contact, therefore will become conductive to shunt the open control contact. The corresponding inactive drive magnet will thus become energized. Both drive magnets are now operative, and the switch stops with its wipers in engagement with the seized bank contacts. The two discharge devices for accomplishing the stopping, as described, are shown in Fig. 1 in full lines.

Figure 2:
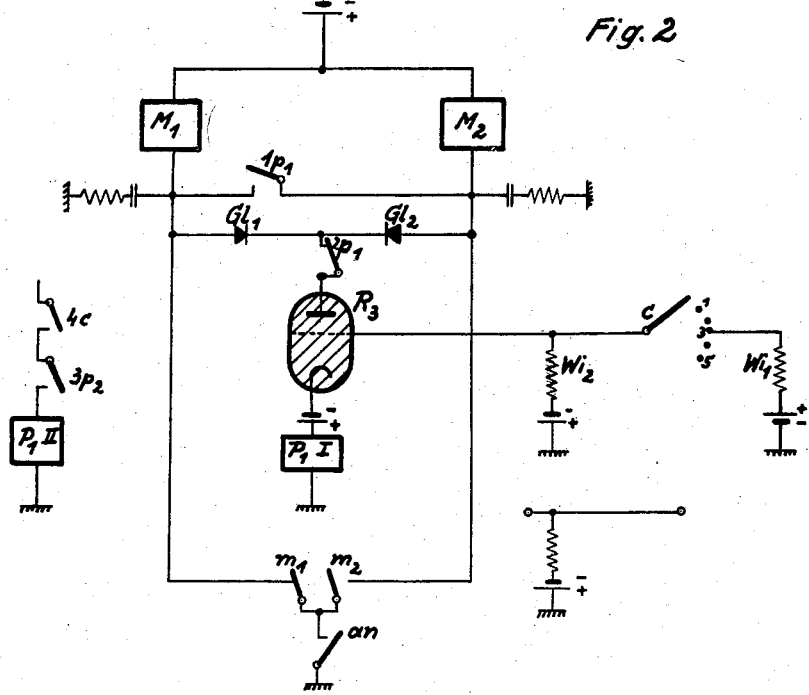
Fig. 2 shows a stop control employing one discharge tube.

The switch shown in Fig. 2 comprises the drive magnets $M_1$ and $M_2$ and the test or private wiper $c$. The remaining wipers have been omitted. The switch is again operated by alternate actuation of the mechanically governed control contacts $m_1$ and $m_2$. If it is assumed that the switch should be stopped with the wiper $c$ in engagement with the bank contact 3, the wiper will encounter a positive battery potential over the resistor $Wi_1$ which is conducted over the wiper $c$ to the grid of the discharge tube $R_3$. This tube, which is prior to this instant inoperative due to the potential connected to the grid over the resistor $Wi_2$, now becomes conductive. This may happen at an instant at which the drive magnet $M_2$ had just become energized by closure of its associated control contact $m_2$, while the drive magnet $M_1$ is just about to deenergize due to opening of its control contact $m_1$. The magnet $M_1$ will in such circumstance remain energized in the plate circuit of the tube $R_3$ over the rectifier $Gl_1$ and, since both drive magnets are energized, the switch will stop. If the condition is reversed, that is, if the drive magnet $M_2$ is just about to deenergize due to the opening of its control contact $m_2$, while the magnet $M_1$ is about to energize over its closed control contact $m_1$, the magnet $M_2$ will be maintained energized in the plate circuit of the tube $R_3$ over the rectifier $Gl_2$. As in the embodiment shown in Fig. 1, a discharge device is again used to shunt the contacts $m_1$ and $m_2$ which control the drive magnets $M_1$ and $M_2$. An auxiliary battery is provided in the cathode circuit of the tube $R_3$ for equalizing a voltage drop in the tube and across the rectifier which happens to be involved, thus supplying the current for maintaining the corresponding drive magnet energized.

A relay $P_1$ having two windings $P_1I$ and $P_1II$ is also provided. This relay is energized over its winding $P_1I$ and closes its contact $1_p1$ to maintain the two magnets $M_1$ and $M_2$ energized in a holding circuit independent of the tube $R_3$ which is disconnected by the opening of the contact $2_p1$. The relay $P_1$ closes at its contact $3_p2$ a holding circuit for its winding $P_1II$ over a contact $4c$. The contact $4c$ is associated with a relay (not shown) which becomes energized at the time when the switch was seized. This relay is now energized and contact $4c$ is accordingly closed. It will be observed that the relay $P_1$ does not serve for stopping the switch but only for carrying out auxiliary switching and control functions.

Figure 3:
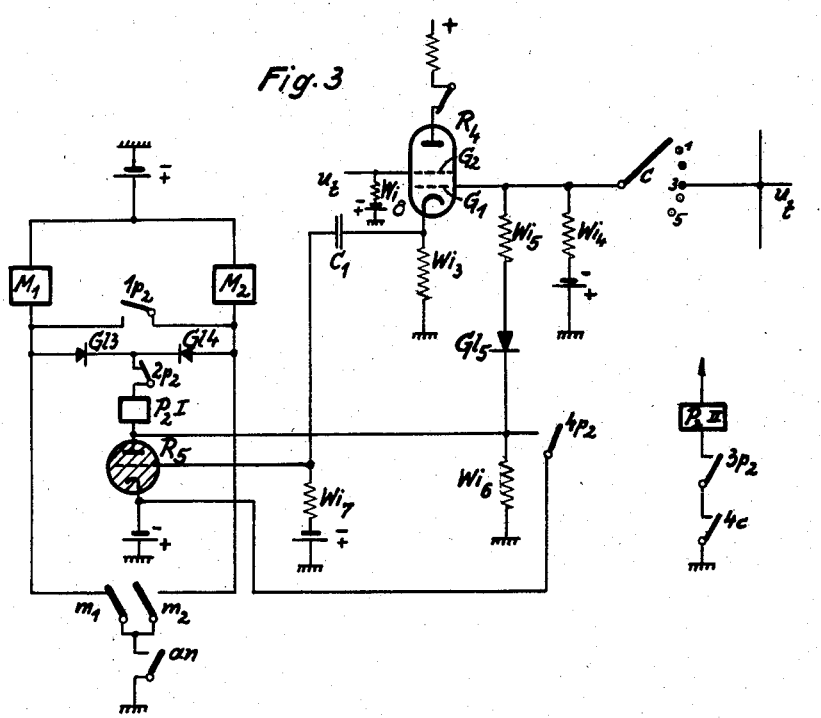
Figs. 3 and 4 show embodiments employing a stop control discharge tube and an auxiliary discharge tube.

In the embodiment shown in Fig. 3, the test potential for stopping the switch is not conducted over the test or private wiper $c$ directly to the grid of the stop control tube $R_5$, but to an auxiliary tube $R_4$ which in turn causes the tube $R_5$ to become conductive. This stop control circuit may, for example, be provided in an installation in which the stopping of a switch on certain bank contacts is only effected at an instant when a momentarily occurring control impulse $u_t$ is connected to the bank contact and also to the switch wiper $c$. A system of this type is disclosed in copending application Ser. No. 273,812, filed February 28, 1952. The tube $R_4$ is in such a case provided with two grids $G_1$ and $G_2$ for testing and ascertaining the simultaneous presence of the control impulse $u_t$. This impulse is connected at a certain instant to the control grid $G_2$ and also to a bank contact of the line or trunk to be seized by the switch, for example, to the bank contact 3, which is accessible to the wiper $c$. The control impulse will be effective at the instant when the wiper $c$ reaches the bank contact 3. Both grids $G_2$ and $G_1$ are negatively biased over the resistors $Wi_8$ and $Wi_5$, respectively, so that the tube $R_4$ can become conductive only when the control impulse is simultaneously present on these grids. Upon becoming conductive, a positive impulse will be produced by the tube $R_4$ at the resistor $Wi_3$ and capacitor $C_1$, producing a potential on the grid of the tube $R_5$, which is normally biased over the resistor $Wi_7$, so that $R_5$ becomes conductive.

The remaining stop control operations correspond substantially to those described in connection with Fig. 2. The discharge tube $R_5$ operates substantially just like the tube $R_3$ in Fig. 2 for shunting the contacts $m_1$ and $m_2$ which control the actuation of the two drive magnets $M_1$ and $M_2$. The drive magnet ($M_1$ or $M_2$) of Fig. 3, which is just about to become energized by the opening of its associated control contact ($m_1$ or $m_2$), is maintained energized. An auxiliary battery in the cathode circuit of the tube $R_5$ equalizes any voltage drop in the tube and in the rectifier $Gl_3$ or $Gl_4$ which happens to be involved, so as to supply to the corresponding drive magnet current of the same magnitude previously supplied over its associated control contact $m_1$ or $m_2$. A relay $P_2$ is provided having its winding $P_2I$ in the plate circuit of the tube $R_5$. This relay energizes and closes its contact $1_p2$ to maintain the magnets $M_1$ and $M_2$ energized. The plate circuit is interrupted at contact $2_p2$ to extinguish the tube $R_5$. Contact $3_p2$ of relay $P_2$ is closed to hold the relay in a holding circuit over its winding $P_2II$ by way of a contact $4c$ of a relay which was energized at the time when the switch was seized.

The seized line or trunk is made busy by a potential placed on the wiper $c$ from the tube $R_5$ over the rectifier $Gl_5$ and the resistor $Wi_5$. This busy potential is replaced upon extinguishing of the tube $R_5$, by the closure of contact $4_p2$ of the relay $P_2$, which short-circuits the tube. The resistor $Wi_5$ is so dimensioned that another substantially simultaneously operating switch will not find sufficient current for the energization of the tube associated therewith (corresponding to tube $R_4$), even if the control impulses $u_t$ are simultaneously on its grids. The resistor $Wi_6$ and the rectifier $Gl_5$ prevent sufficient current on the lower grid of the discharge tube $R_4$ at the time when the tube $R_5$ is not operated. The closure of the contact $1_p2$ keeps the magnets $M_1$ and $M_2$ energized and the switch is thus maintained in stop position. The closure of contact $4_p2$ maintains busy potential on the bank contact of the seized line or trunk.

Figure 4:
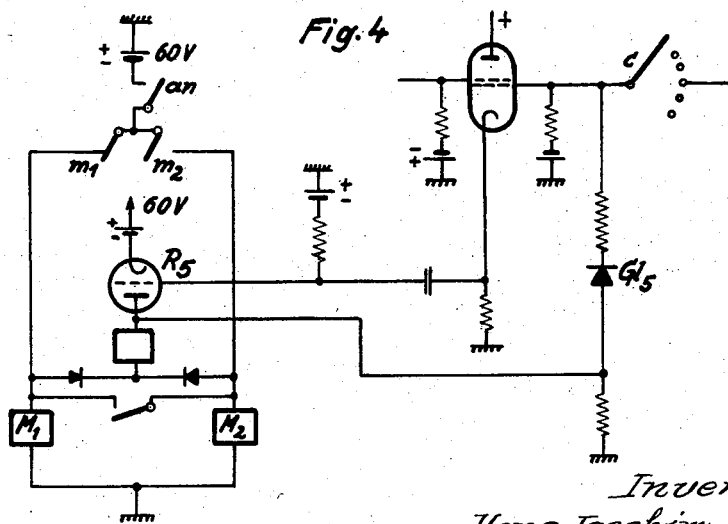

The circuit shown in Fig. 4 corresponds in all respects to the one indicated in Fig. 3, except that it employs a 60 v. battery having its positive pole grounded instead of its negative pole, as is customary in automatic telephone systems.

Changes may be made within the scope and spirit of the appended claims.

We claim:

1. In a switch for use in an automatic telephone system, having a shaft carrying wipers including a private wiper and having a drive motor for said shaft comprising two drive magnets and control contacts therefor for causing said drive magnets to operate alternately so as to rotate said shaft to advance said wipers with respect to stationary bank contacts, one of said drive magnets and control contact coacting therewith being, during the rotation of said shaft operated while the other drive magnet and control contact respectively coacting therewith are ineffective; a stop control device for stopping rotation of said shaft by said drive magnets responsive to engagement of a desired bank contact by said private wiper, said stop control device comprising a stop control discharge tube, circuit means for causing said tube to become conductive at the instant when said private wiper establishes engagement with a desired bank contact, and control circuit means including the discharge path of said tube for bridging the control contact associated with and coacting with the drive magnet which is at that instant ineffective so as to energize such drive magnet while the other drive magnet is energized, the joint energization of said drive magnets being effective to stop further rotation of said shaft.

2. A structure and cooperation of parts according to claim 1, comprising relay means for respectively disconnecting said discharge tube and for maintaining said drive magnets energized independently of said tube.

3. A structure and coperation of parts according to claim 1, comprising a discharge tube for controlling the circuit of each of said drive magnets and control contact means coacting therewith.

4. A structure and cooperation of parts according to claim 1, comprising a further discharge tube, said further discharge tube having an electrode in circuit with said private wiper, and circuit means governed by said further tube for controlling the operation of said stop control discharge tube.

5. In a selector switch having wipers including a private wiper and having a motor for moving said wipers relative to bank contacts, said motor comprising a pair of drive magnets and control contacts respectively coacting therewith to cause said drive magnets to become alternately operatively effective to drive said wipers with respect to said bank contacts; a device for stopping said motor with said private wiper in engagement with a desired bank contact, said device comprising a stop control discharge tube, and circuit means effective when said private wiper establishes engagement with a desired bank contact for conducting to said tube a control potential signifying stopping of said motor to cause said tube to become conductive, the current flow in said tube being effective to bridge one of said control contacts to cause energization of the drive magnet coacting therewith while the other drive magnet is energized, the joint energization of said drive magnets being effective to stop further operative actuation of said motor.

6. A structure and cooperation of parts according to claim 5, comprising first rectifier means in said circuit means in series with said tube and in parallel with one of said control contacts, and oppositely poled second rectifier means in series with said tube and in parallel with the other control contact.

7. A structure and cooperation of parts according to claim 5, comprising a first rectifier connected in said circuit means in series with said tube and in parallel with one of said control contacts, an oppositely poled second rectifier connected in series with said tube and in parallel with another one of said control contacts, and a current source in the cathode circuit of said stop control discharge tube for compensating for voltage drops in such tube and across the rectifier which is associated with the control contact to be bridged.

8. A structure and cooperation of parts according to claim 5, comprising a further discharge tube, means for simultaneously conducting to said further tube control impulses including an impulse conducted thereto over said private wiper in engagement with a desired bank contact on which said wiper is to stop to make said further tube conductive, and circuit means controlled by said further tube for conducting a control potential therefrom to said stop control discharge tube so as to actuate said last named tube.

9. A structure and cooperation of parts according to claim 5, wherein said circuit means comprises said private wiper, and means for placing on the bank contact engaged by said private wiper a busy potential directly from the circuit of said stop control tube immediately after such tube has become conductive.

10. A structure and cooperation of parts according to claim 5, wherein said circuit means comprises said private wiper, means for placing on the bank contact engaged by said private wiper a busy potential directly from the circuit of said stop control tube immediately after such tube has become conductive, means for disconnecting said stop control tube, and means for thereafter maintaining said busy potential independent of said tube.

References Cited in the file of this patent

UNITED STATES PATENTS

| | | |
|---|---|---|
| 2,576,097 | Bray et al. | Nov. 27, 1951 |
| 2,616,980 | Buchner | Nov. 4, 1952 |
| 2,654,000 | Deakin | Sept. 29, 1953 |